(12) United States Patent
Sakamoto (10) Patent No.: US 7,675,693 B2
(45) Date of Patent: Mar. 9, 2010

(54) OPTICAL ACCESSORY ARRANGED TO CHANGE OPTICAL CHARACTERISTIC OF SHOOTING LENS

(75) Inventor: Masaru Sakamoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 348 days.

(21) Appl. No.: 11/683,715

(22) Filed: Mar. 8, 2007

(65) Prior Publication Data
US 2007/0223101 A1 Sep. 27, 2007

(30) Foreign Application Priority Data
Mar. 23, 2006 (JP) .............................. 2006-080461

(51) Int. Cl.
*G02B 9/04* (2006.01)
(52) U.S. Cl. .................. 359/793; 359/691; 359/708
(58) Field of Classification Search ................ 359/793, 359/691, 708, 717, 738, 794
See application file for complete search history.

(56) References Cited

U.S. PATENT DOCUMENTS

| 4,961,085 | A | * | 10/1990 | Cho et al. | ................ 396/6 |
| 6,097,551 | A | * | 8/2000 | Kreitzer | ................ 359/793 |
| 6,259,508 | B1 | * | 7/2001 | Shigematsu | ................ 355/53 |
| 6,980,375 | B2 | * | 12/2005 | Nagaoka | ................ 359/736 |
| 7,113,345 | B2 | * | 9/2006 | Mihara et al. | ................ 359/676 |

FOREIGN PATENT DOCUMENTS

| JP | 62-138814 | 6/1987 |
| JP | 05-040221 | 2/1993 |
| JP | 11-305119 | 11/1999 |

OTHER PUBLICATIONS

Extended European Search Report issued on Jun. 4, 2007 for European counterpart application No. EP 07103945.7.

* cited by examiner

*Primary Examiner*—Timothy J Thompson
(74) *Attorney, Agent, or Firm*—Rossi, Kimms & McDowell LLP (57) ABSTRACT

An optical accessory having a high optical performance arranged to change an optical characteristic of a shooting lens and to be attached on the object side of a shooting lens is provided. The optical accessory FE is to be detachably attached to the object side of a master lens M and has at least one lens FE having a negative refractive power. The image-side surface r2 of the lens FE is designed to have an aspherical shape having a negative refractive power that decreases toward its periphery.

3 Claims, 11 Drawing Sheets

OPTICAL ACCESSORY ARRANGED TO CHANGE OPTICAL CHARACTERISTIC OF SHOOTING LENS

BACKGROUND OF THE INVENTION

1. Field of the Invention

The present invention relates to a fisheye attachment to be attached to the object side of a shooting lens of an image-pickup apparatus, such as a still camera or a video camera, to give a fisheye effect. The fisheye attachment according to the present invention is an optical accessory to be detachably attached to a shooting lens to change optical characteristics of the lens.

2. Description of the Related Art

When a fisheye effect, or an effect of giving a distortion that is particularly conspicuous in the peripheral area of an image is desired in photo shooting, an optical accessory such as a converter or an attachment is attached to the object side of a shooting lens in the wide angle end state to produce a large negative distortion as discussed in, for example, Japanese Patent Laid-Open No. H11-305119.

In recent years, with the spread of high definition broadcasting systems represented by the HDTV broadcasting, shooting lenses are required to have high optical performance. Accordingly, high performance optical accessories such as attachments to be attached to such shooting lenses are also demanded. To meet such a demand, it is necessary that aberrations of the optical accessories themselves be corrected satisfactorily.

In particular, fisheye attachments are designed in such a way that a large negative distortion that satisfies the following condition in terms of the image height y, the beam incidence angle θ and the focal length f of the lens is generated.

$$y/(2 \times f) = \sin(\theta/2) \qquad (1)$$

However, the fisheye attachment is generally composed of a single negative lens, which cannot achieve the desired aberration correction. In particular, satisfactory correction of astigmatism and field curvature cannot be achieved.

An object of the present invention is to provide a fisheye attachment having excellent optical performance by correcting aberrations, in particular astigmatism and field curvature.

SUMMARY OF THE INVENTION

According to a first aspect of the present invention there is provided an optical accessory arranged to change an optical characteristic of a shooting lens and to be detachably attached to an object side of a shooting lens, wherein the optical accessory includes at least one lens FE having a negative refractive power, the image-side surface of the lens FE being an aspherical surface having a negative refractive power that decreases from the optical axis to its peripheral portion.

In some optical accessories embodying the invention, the following conditions are satisfied:

$$8.0 \times 10^{-4} < |\Delta 7/fe| < 2.0 \times 10^{-2},$$

$$0.3 < \Delta 4/\Delta 7 | < 0.65, \text{ and}$$

$$0.4 < \Delta 9/\Delta 7 | < 1.0,$$

where fe represents the focal length of the lens FE, and Δ9, Δ7 and Δ4 respectively represent the aspherical amounts at the image heights of 90%, 70% and 40% of the effective diameter of the lens FE having the aspherical surface, the aspherical amount is defined by a distance between the aspherical surface of the aspherical lens FE and a spherical surface along the optical axis direction, where the spherical surface has a center of curvature radius on the optical axis and contains three points: a vertex of the aspherical lens FE; and both ends of the maximum effective diameter of the aspherical lens FE.

In other embodiments, the following conditions are satisfied:

$$-1.5 < SFa < 0.2, \text{ and}$$

$$SFa = (r1 + r2)/(r1 - r2)$$

where r1 represents the curvature radius of the object side surface of the lens FE and r2 represents the curvature radius of the image side surface of the lens FE, the curvature radius of the aspherical lens FE is defined by a curvature radius of a spherical surface that has a center of curvature radius on the optical axis and contains three points: a vertex of the aspherical lens FE; and both ends of the maximum effective diameter of the aspherical lens FE.

There may also be provided a shooting lens on which the optical accessory set out in the forgoing is attached.

There may also be provided an image-pickup apparatus comprising the optical accessory set out in the foregoing and a shooting lens on which the optical accessory is attached.

Further features of the present invention will become apparent from the following description of exemplary embodiments with reference to the attached drawings.

The described fisheye attachments have at least one lens having a negative refractive power. The negative lens is designed to have an aspherical surface, and the shape and the aspherical shape of the constituent lens(es) are appropriately determined, whereby excellent optical performance can be achieved with improved astigmatism and field curvature.

DESCRIPTION OF THE EMBODIMENTS

A fisheye attachment is an optical accessory to be detachably attached to a shooting lens to change optical characteristics of the shooting lens.

Further, the fisheye attachment of the present invention is an optical accessory which causes a large negative distortion satisfying the following equation, $$y/(2 \times f) = \sin(\theta/2),$$

where y represents an image height, θ represents incident angle of the light beam, and f represents focal length of the lens. Note that the image-pickup angle is not limited to 180 degrees.

First Embodiment

Figure 1:
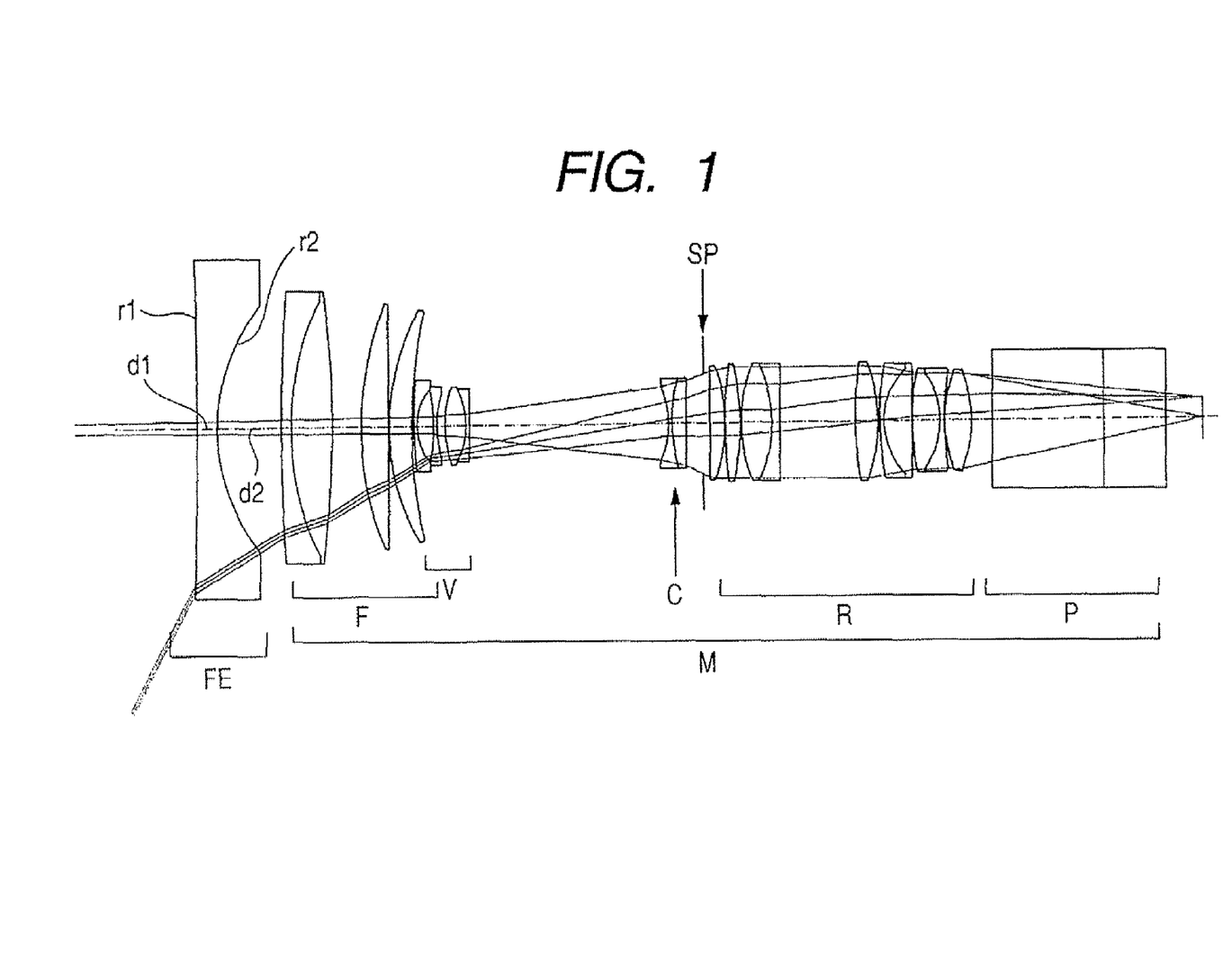
FIG. 1 is a cross-sectional view of a lens according to a first embodiment at the wide-angle end.

FIG. 1 is a cross-sectional view of a lens according to a first embodiment of the present invention in its wide-angle end state. A fisheye attachment lens FE is attached on the front side of a shooting lens as the master lens M. The master lens M has a front lens unit F functioning as the focusing unit, a variator V, a compensator C, a stop SP, a relay lens unit R and a color split prism or an optical filter P arranged in the mentioned order from front to rear.

The front lens unit F has, as the first unit, a positive refractive power. The variator V has, as the second lens unit, a negative refractive power and is moved monotonously along the optical axis toward the image plane to change the magnification of the lens from the wide-angle end to the telephoto end. The compensator C has a negative refractive power and is adapted to be moved non-linearly along the optical axis to compensate image-plane variations caused upon changing the magnification. The variator V and the compensator C constitute a magnification-changing optical system. The relay-lens unit R has, as the fixed fourth unit, a positive refractive power. There also is provided an optical element(s) P such as a color-split prism and/or an optical filter. The element P is illustrated as a glass block, in the case shown in FIG. 1. On the image side of the color-split prism or the optical filter is provided an image-pickup element such as a CCD sensor or a CMOS sensor. The image-pickup apparatus according to the present invention has the fisheye attachment FE, the master lens M and the image-pickup element. The image-pickup apparatus may be applied to a consumer still camera, a consumer video camera and a broadcast camera.

The fisheye attachment FE is a negative lens having an image-side surface r2 that is convex toward the object side. The fisheye attachment FE has a function of shortening the focal length of the master lens M or enlarging the angle of field of the master lens M and generating a large negative distortion to give a fisheye effect. If the fisheye attachment FE has only spherical surfaces, astigmatism and field curvature are generated particularly at the image-side surface r2, which leads to deterioration in the optical performance in the peripheral area of the image. In view of this, in this embodiment, the image-side surface r2 is designed to be an aspherical surface with a negative refractive power decreasing toward its periphery, whereby the generation of astigmatism and field curvature is reduced and a flat image plane is achieved.

More preferably, the aspherical shape of the surface of the fisheye attachment FE may be designed to satisfy the following conditions (2) to (4), where fe represents the focal length of the fisheye attachment, and Δ9, Δ7 and Δ4 respectively represent the aspherical amounts at the image heights of 90%, 70% and 40% of the effective diameter of the lens having that aspherical surface.

$$8.0 \times 10^{-4} < |\Delta 7/fe| < 2.0 \times 10^{-2} \quad (2)$$

$$0.3 < |\Delta 4/\Delta 7| < 0.65 \quad (3)$$

$$0.4 < |\Delta 9/\Delta 7| < 1.0 \quad (4)$$

Here, the aspherical amount is defined by a distance between the aspherical surface of the aspherical lens FE and a spherical surface along the optical axis direction, where the spherical surface has a center of curvature radius on the optical axis and contains three points: a vertex of the aspherical lens FE; and both ends of the maximum effective diameter of the aspherical lens FE.

When the value |Δ7/fe| in condition (2) becomes smaller than the lower limit, the astigmatism correction effect becomes small, which leads to an increase in the remaining large positive astigmatism. On the other hand, when the value |Δ7/fe| in condition (2) becomes larger than the upper limit, the astigmatism correction effect becomes excessively large, which leads to a significantly large negative astigmatism.

When the value |Δ4/Δ7| in condition (3) becomes smaller than the lower limit, the astigmatism correction effect at the 40% image height becomes very small as compared to that at the 70% image height, and flatness of the image surface cannot be achieved. On the other hand, when the value |Δ4/Δ7| in condition (3) becomes larger that the upper limit, the astigmatism correction effect at the 40% image height becomes excessively large as compared to that at the 70% image height, and flatness of the image surface cannot be achieved.

When the value |Δ9/Δ7| in condition (4) becomes smaller than the lower limit, the astigmatism correction effect at the 90% image height becomes very small as compared to that at the 70% image height, and flatness of the image surface cannot be achieved. On the other hand, when the value |Δ9/Δ7| in condition (4) becomes larger that the upper limit, the astigmatism correction effect at the 90% image height becomes excessively large as compared to that at the 70% image height, and flatness of the image surface cannot be achieved.

It is more desirable that the following condition be further satisfied.

$$-1.5 < SFa < 0.2 \quad (5)$$

Value SFa in condition is represented by the following equation:

$$SFa = (r1 + r2)/(r1 - r2) \quad (6)$$

where r1 represents the curvature radius of the object side surface and r2 represents the curvature radius of the image side surface under the assumption that the curvature radius of the aspherical lens FE is defined as a curvature radius of a spherical surface that has a center of curvature radius on the optical axis and contains three points: a vertex of the aspherical lens FE; and both ends of the maximum effective diameter of the aspherical lens FE.

Condition (5) is added to make the value of the distortion generated by the fisheye attachment FE appropriate so as to give a suitable fisheye effect. Below the lower limit of condition (5), the negative distortion becomes too high to give a suitable fisheye effect, or off-axial principal rays cannot be incident on the object side surface of the negative lens, which leads to eclipse. On the other hand, above the upper limit, the negative distortion becomes too low to give a suitable fisheye effect, or the curvature of the image-side surface of the negative lens becomes so large that it becomes difficult to make such a lens. Generally, an imaging optical system for image-pickup is designed with a suppressed distortion. The imaging relationship in terms of the image height y, the incidence angle θ of off-axis principal rays and the focal length f of the lens is expressed approximately by the following equation.

$$y/(2 \times f) = \tan(\theta/2) \quad (7)$$

To give an ideal fisheye effect, it is desirable that a negative distortion be generated in the fisheye attachment FE so that the following condition concerning the focal length conversion magnification βFE of the fisheye attachment is satisfied.

$$y/(2 \times f \times \beta FE) = \sin(\theta/2) \tag{8}$$

Figure 2:
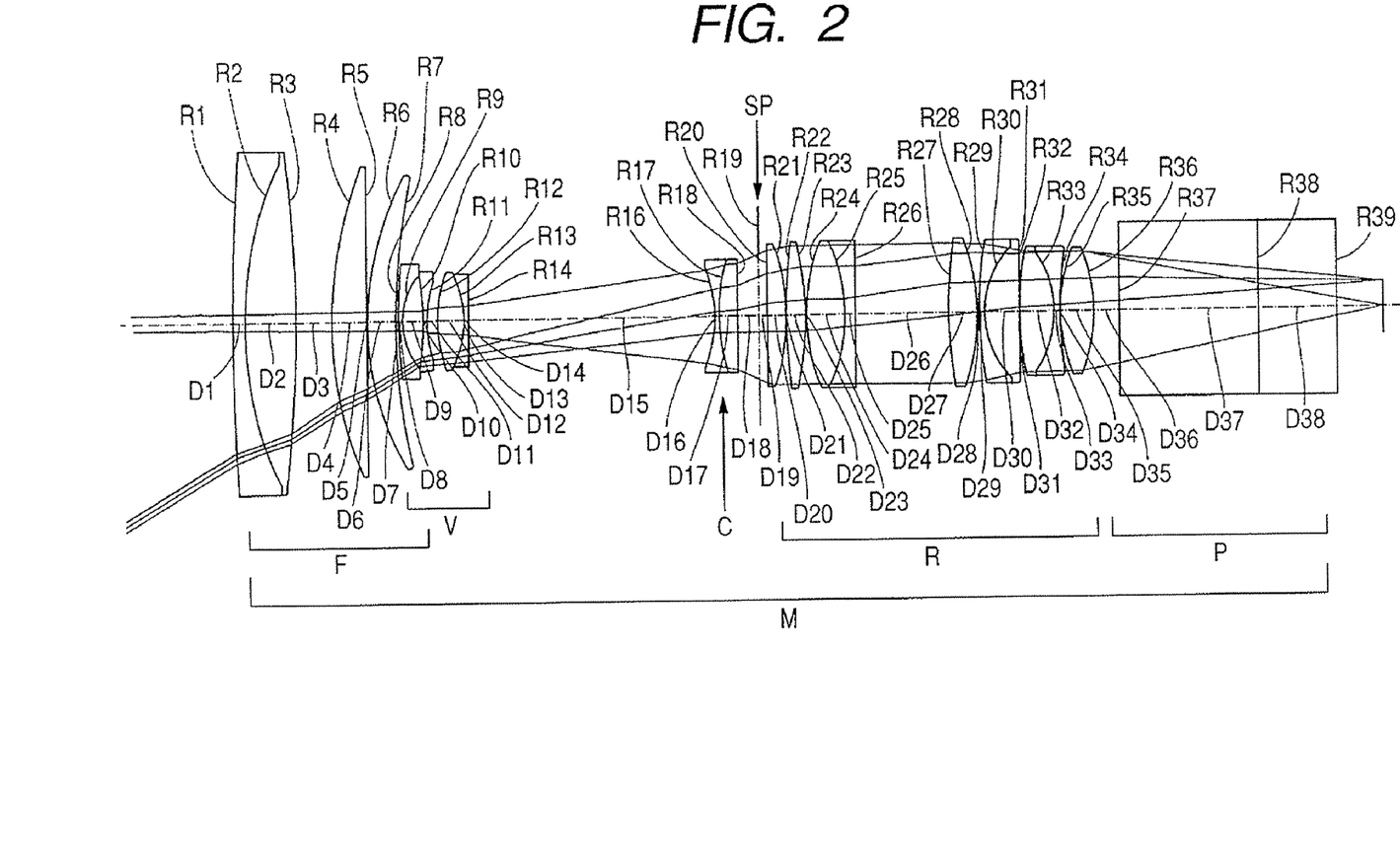
FIG. 2 is a cross-sectional view of a master lens at the wide-angle end.

FIG. 2 is a cross-sectional view of the master lens M, at the wide-angle end, to which the fisheye attachment FE is to be attached.

In the following, a numerical example of the master lens M will be described. In the following table, R represents the curvature radius of each lens surface of the master lens M, D represents the surface interval, N represents the refractive index for the e-line, and ν represents the Abbe number. In addition, f represents the focal length of the entire system, Fno represents the F number, Bf represents the back focus, 2ω represents the angle of field, and Y represents the image height.

Here, the angle of field 2ω is one in the case where distortion is not taken into account. When distortion is taken into account, the angle of field A can be calculated from the following equation using the value Di (%) of the distortion at the 100% image height in each aberration diagram.

$$A = 2 \times \tan^{-1}\{\tan \omega \times 100/(100+Di)\} \tag{9}$$

In Table 1, examples of various values on the master lens M are presented.

TABLE 1

Diagonal Screen Size: 11 mm f = 9.5-185.25, Fno = 1.850-2.850, 2ω = 60.1°-3.4°

| | | | |
|---|---|---|---|
| R1 = 600.261, | D1 = 2.20, | N1 = 1.7617, | ν1 = 27.51 |
| R2 = 81.461, | D2 = 11.42, | N2 = 1.4985, | ν2 = 81.61 |
| R3 = −290.956, | D3 = 7.63 | | |
| R4 = 86.701, | D4 = 7.86, | N3 = 1.6229, | ν3 = 60.28 |
| R5 = 3044.710, | D5 = 0.15 | | |
| R6 = 66.016, | D6 = 6.01, | N4 = 1.7323, | ν4 = 54.68 |
| R7 = 145.709, | D7 = variable | | |
| R8 = 111.445, | D8 = 0.80, | N5 = 1.8881, | ν5 = 40.78 |
| R9 = 16.812, | D9 = 4.65 | | |
| R10 = −47.8421, | D10 = 0.70, | N6 = 1.8202, | ν6 = 46.62 |
| R11 = 33.779, | D11 = 2.24 | | |
| R12 = 28.944, | D12 = 5.20, | N7 = 1.8126, | ν7 = 25.43 |
| R13 = −29.192, | D13 = 0.54 | | |
| R14 = −24.664, | D14 = 0.70, | N8 = 1.7920, | ν8 = 47.38 |
| R15 = 132.572, | D15 = variable | | |
| R16 = −28.806, | D16 = 0.75, | N9 = 1.7468, | ν9 = 49.31 |
| R17 = 37.218, | D17 = 3.81, | N10 = 1.8550, | ν10 = 23.89 |
| R18 = 449.023, | D18 = variable | | |
| R19 = stop, | D19 = 1.80 | | |
| R20 = ∞, | D20 = 3.79, | N11 = 1.7279, | ν11 = 38.03 |
| R21 = −46.584, | D21 = 0.20 | | |
| R22 = 166.702, | D22 = 3.92, | N12 = 1.5131, | ν12 = 60.49 |
| R23 = −63.568, | D23 = 0.20 | | |
| R24 = 42.1598, | D24 = 8.34, | N13 = 1.4891, | ν13 = 70.21 |
| R25 = −33.917, | D25 = 1.66, | N14 = 1.8393, | ν14 = 37.17 |
| R26 = 172.175, | D26 = 21.27 | | |
| R27 = 111.436, | D27 = 6.19, | N15 = 1.5035, | ν15 = 56.4 |
| R28 = −44.823, | D28 = 0.20 | | |
| R29 = 82.661, | D29 = 1.40, | N16 = 1.8393, | ν16 = 37.17 |
| R30 = 20.646, | D30 = 7.09, | N17 = 1.5035, | ν17 = 56.4 |
| R31 = 284.915, | D31 = 0.15 | | |
| R32 = 60.636, | D32 = 7.53, | N18 = 1.5183, | ν18 = 64.15 |
| R33 = −24.607, | D33 = 1.40, | N19 = 1.8081, | ν19 = 46.58 |
| R34 = 105.806, | D34 = 0.30 | | |
| R35 = 44.171, | D35 = 6.68, | N20 = 1.5035, | ν20 = 56.4 |
| R36 = −37.129, | D36 = 5.00 | | |

TABLE 1-continued

Diagonal Screen Size: 11 mm

| | | | |
|---|---|---|---|
| R37 = ∞, | D37 = 30.00, | N21 = 1.6072, | ν21 = 38.01 |
| R38 = ∞, | D38 = 16.20, | N22 = 1.5183, | ν22 = 64.15 |
| R39 = ∞, | | | |

| focal length | | |
|---|---|---|
| 9.50, | 38.86, | 185.25 |

| variable distance | | |
|---|---|---|
| D7 | 0.65, | 35.96, | 52.03 |
| D15 | 53.75, | 13.38, | 6.33 |
| D18 | 5.10, | 10.15, | 1.15 |

Bf 9.9366 Y 5.5

When the fisheye attachment FE is attached on the master lens M, surfaces R27 to R36 in the master lens M are moved parallel to the optical axis as a unit to effect focusing.

Figure 3:
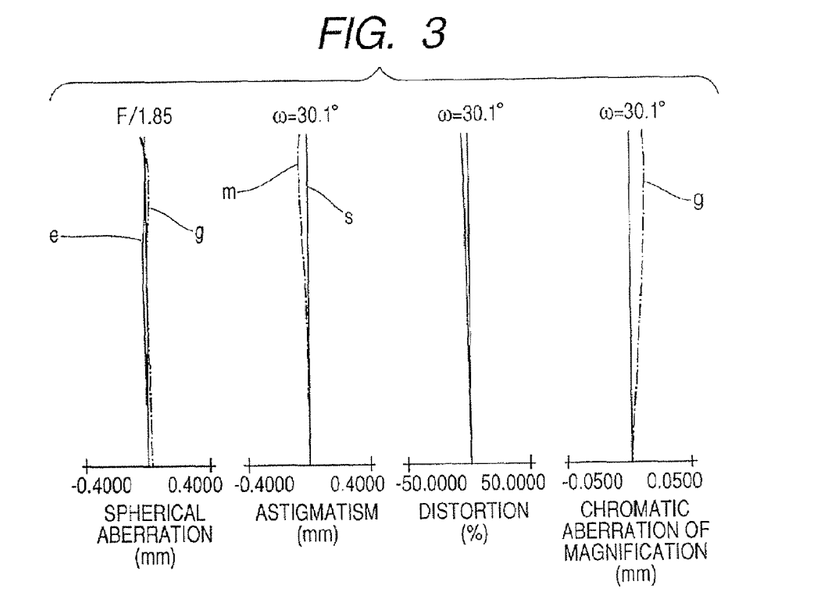
FIG. 3 shows aberrations of the master lens at the wide-angle end.

FIG. 3 shows aberrations of the master lens M at the wide-angle end, where aberrations for the e-line are designated by "e", aberrations for the g-line is designated by "g", the meridional image plane is designated by "m", and the sagittal image plane is designated by "s".

The fisheye attachment FE according to the first embodiment includes a lens having an aspherical surface r2 with a negative refractive power. The aspherical surface shape is expressed by the following equation (10), where the coordinate along the optical axis is represented by x, the coordinate along the direction perpendicular to the optical axis is represented by y, r represents a reference curvature radius, k represents the conic constant, and Cn represents the n-th order aspherical coefficient.

$$x = (y^2/r)/\{1+(1-k \cdot y^2/r^2)^{0.5}\} + C2 \cdot y^2 + C4 \cdot y^4 + C6 \cdot y^6 + C8 \cdot y^8 + C10 \cdot y^{10} \tag{10}$$

Figure 4:
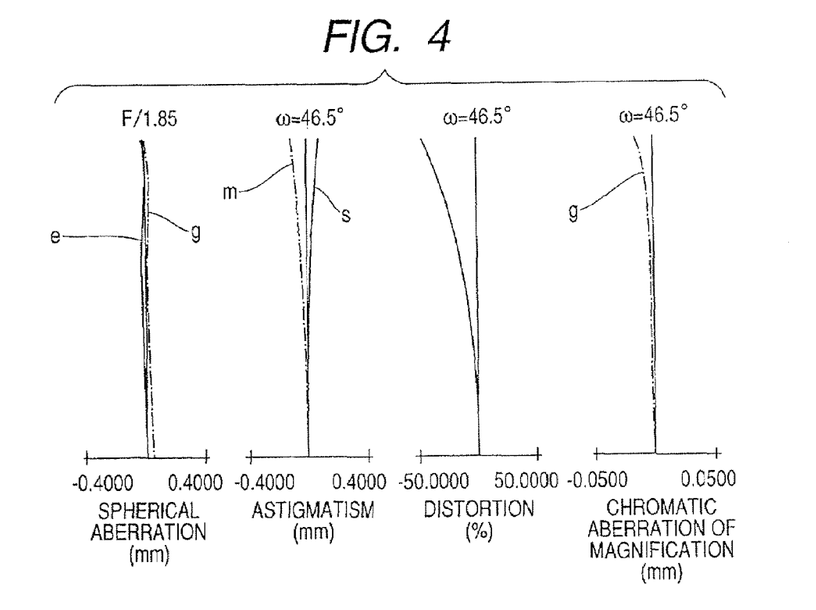
FIG. 4 shows aberrations in the first embodiment at the wide-angle end.

FIG. 1 is a cross-sectional view of the lens in the state in which the above-described fisheye attachment FE according to the first embodiment is attached on the master lens M that is set to the wide-angle end. FIG. 4 shows aberrations in that state.

In Table 2 are presented various values on a first numerical embodiment of the fisheye attachment FE according to the first embodiment.

In Table 2, n represents the refractive index for the e-line, and ν represents the Abbe number. In addition, r represents the curvature radius of each lens surface in the fisheye attachment FE, d represents the surface interval, r* represents the curvature radius of the aspherical lens FE is defined as a curvature radius of a reference spherical surface that has a center of curvature radius on the optical axis and contains three points: a vertex of the aspherical lens; and both ends of the maximum effective diameter of the aspherical lens, and r** represents the local curvature radius of the aspherical surface.

TABLE 2

| | | | |
|---|---|---|---|
| r1 = −963.909 | d1 = 5.00 | n1 = 1.6055 | ν1 = 60.64 |
| r2 = 51.236 | d2 = 17.15 | | |
| r2* = 55.399 | | | |
| r2** = 49.368 | | | |

TABLE 2-continued

Aspherical Coefficient:

C2 = 3.6928 · 10⁻⁴    C4 = −1.0542 · 10⁻⁶    C6 = −2.1282 · 10⁻¹¹
C8 = −2.8396 · 10⁻¹⁴   C10 = −1.0588 · 10⁻¹⁶   K = 0.0000

Figure 5:
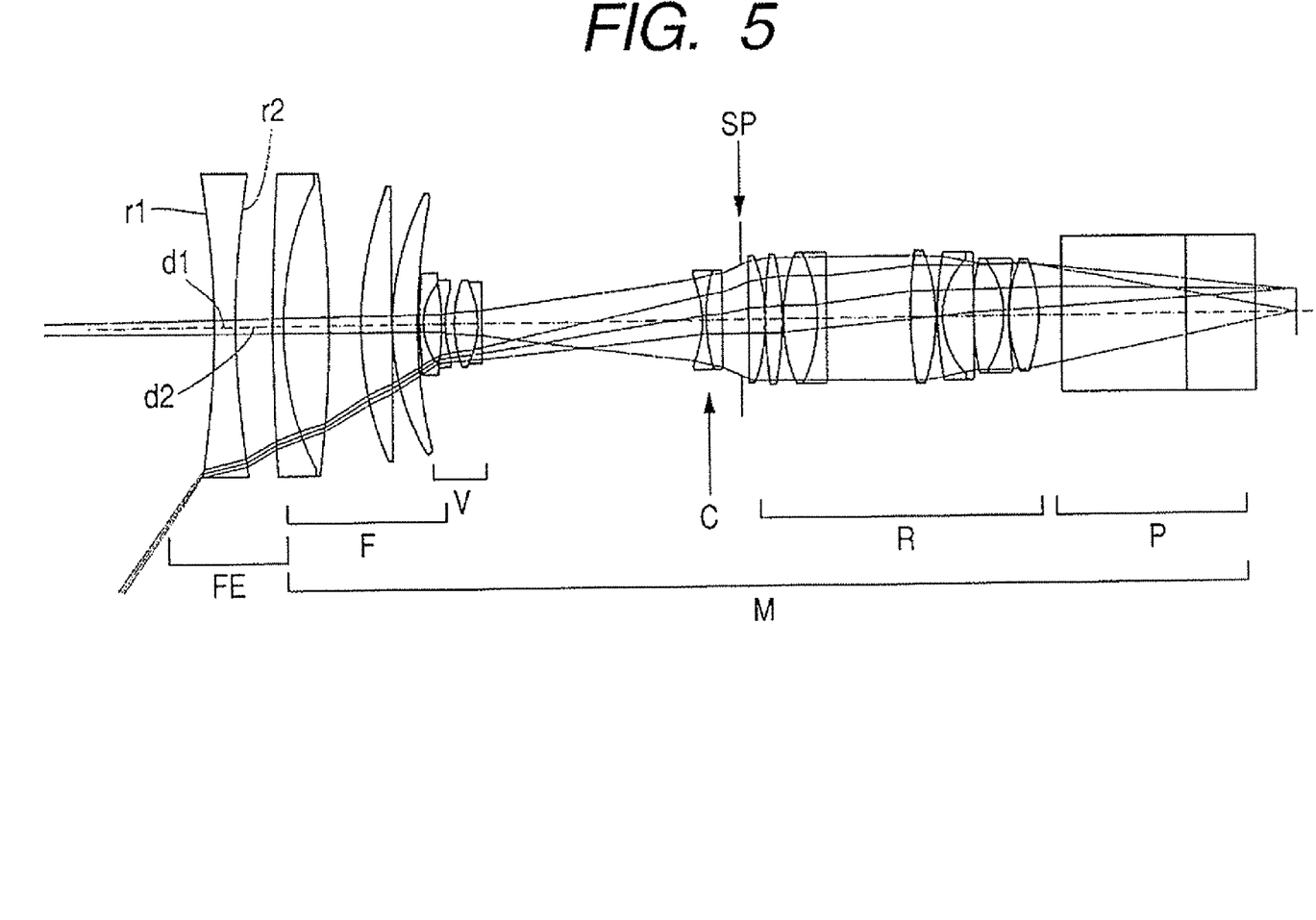
FIG. 5 is a cross-sectional view of a lens according to a second embodiment at the wide-angle end.
Figure 6:
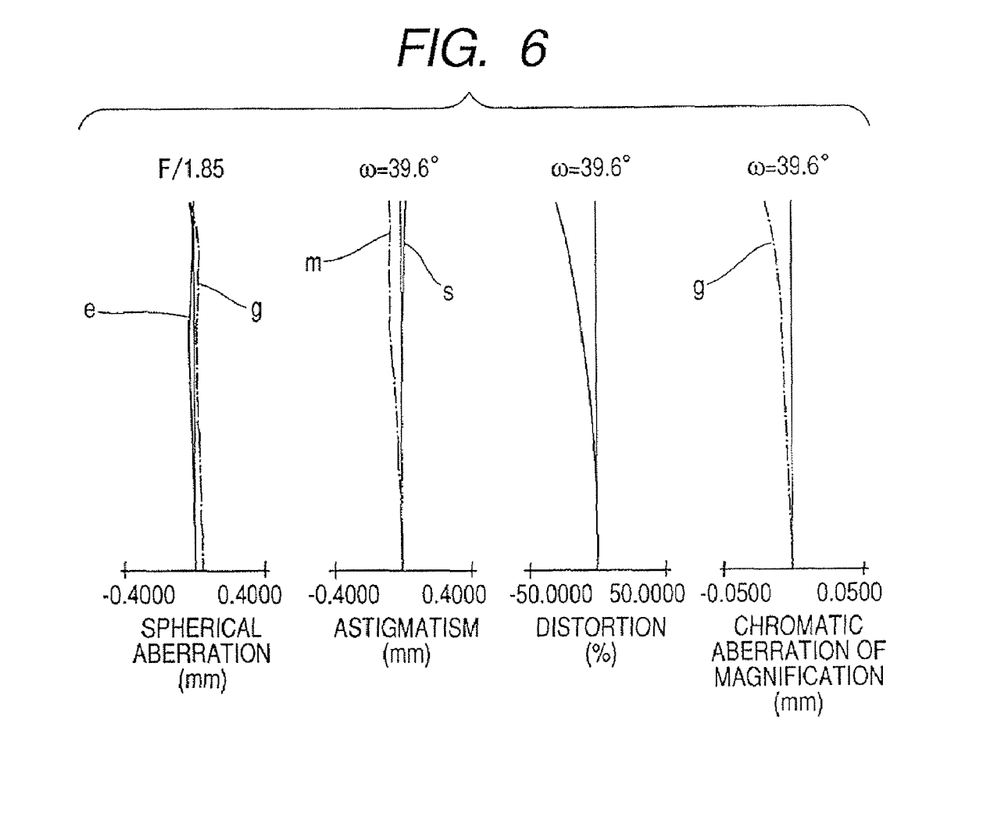
FIG. 6 shows aberrations in the second embodiment at the wide-angle end.

Values in the state in which the fisheye attachment FE according to the first embodiment is attached to the master lens M: f=5.224 mm, 2ω=92.90, Y 5.5 mm Second Embodiment FIG. 5 is a cross-sectional view of the lens in the state in which a fisheye attachment FE according to a second embodiment is attached on the master lens M that is set to the wide-angle end. FIG. 6 shows aberrations in that state.

In Table 3 are presented various values on a second numerical embodiment of the fisheye attachment FE according to the second embodiment.

TABLE 3

| r1 = −284.668 | d1 = 5.00 | n1 = 1.8881 | ν1 = 40.76 |
|---|---|---|---|
| r2 = 81.892 | d2 = 6.47 | | |
| r2* = 244.164 | | | |
| r2** = 183.488 | | | |

Aspherical Coefficient:

C2 = −3.3806 · 10⁻³    C4 = −1.0428 · 10⁻⁶    C6 = 2.2389 · 10⁻¹⁰
C8 = −2.8564 · 10⁻¹⁴   C10 = −2.1355 · 10⁻¹⁷   K = 0.0000

Figure 7:
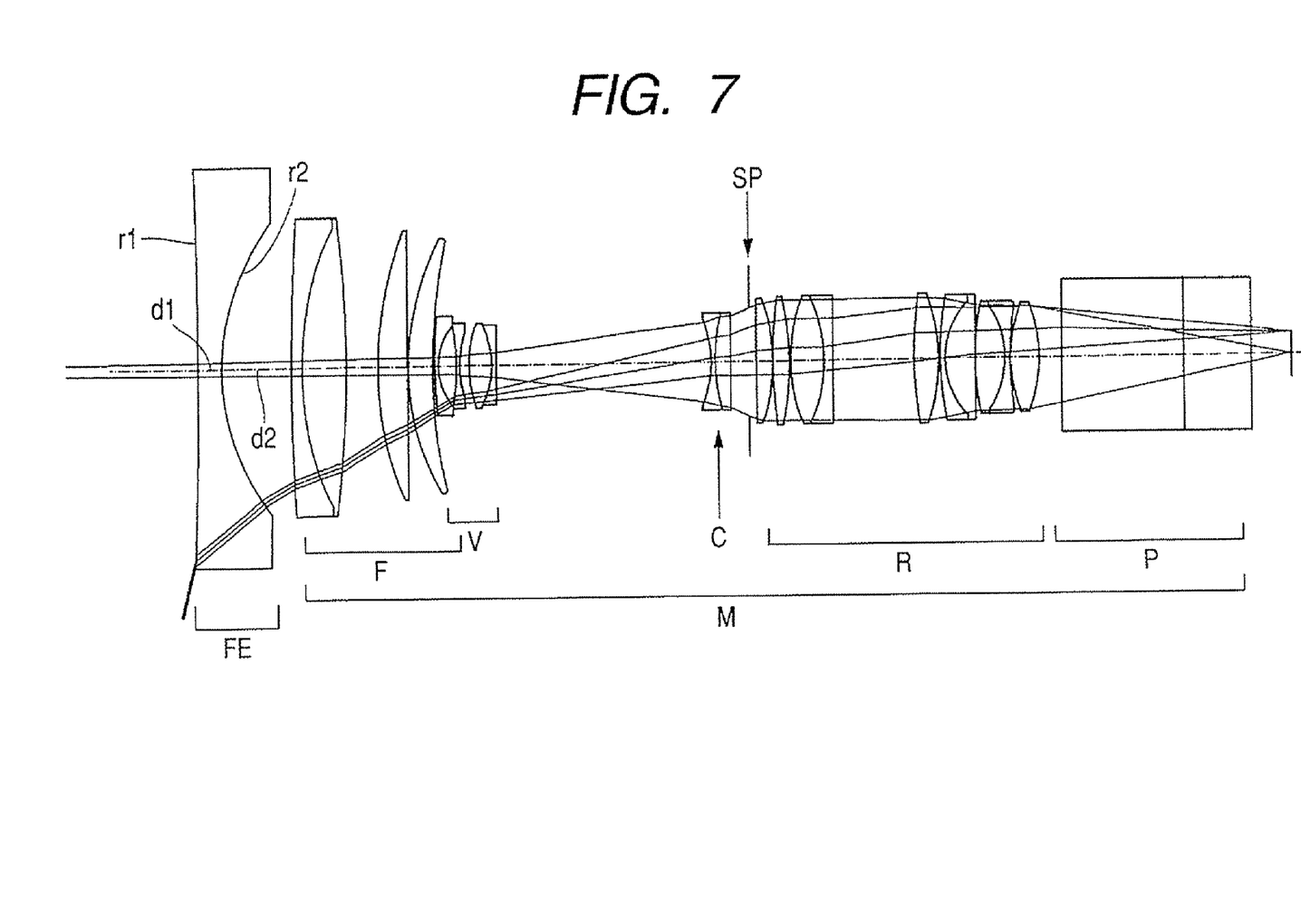
FIG. 7 is a cross-sectional view of a lens according to a third embodiment at the wide-angle end.
Figure 8:
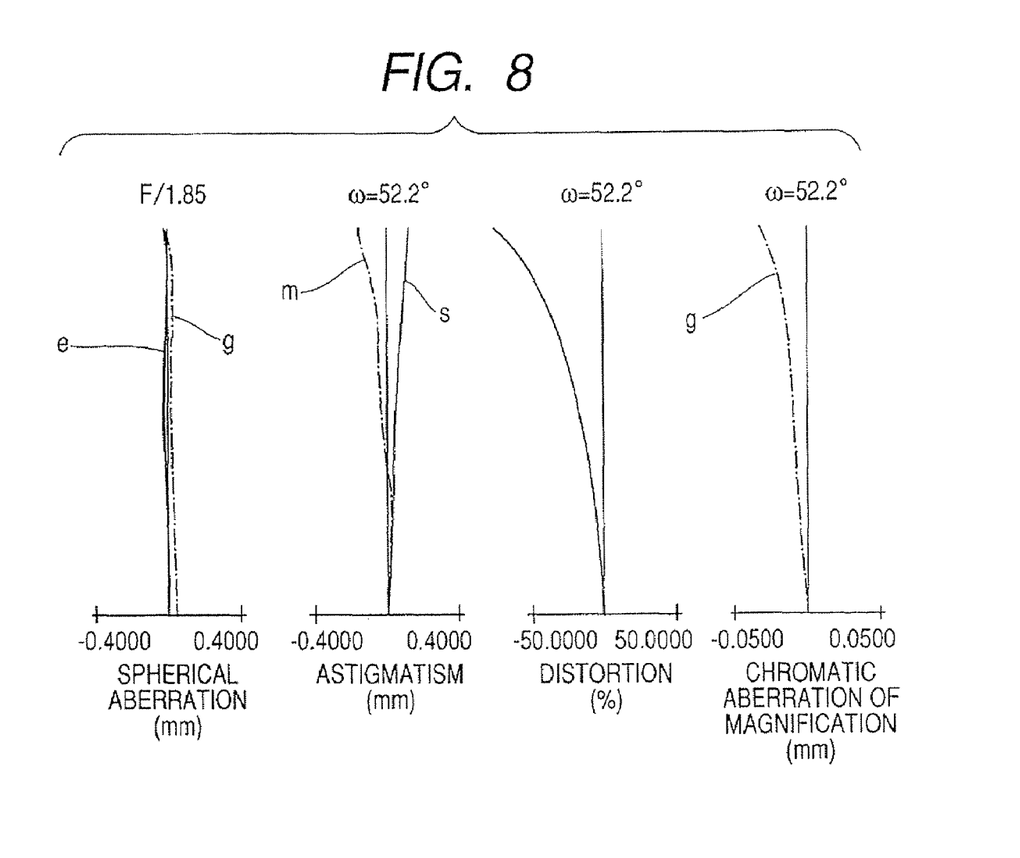
FIG. 8 shows aberrations in the third embodiment at the wide-angle end.

Values in the state in which the fisheye attachment FE according to the second embodiment is attached to the master lens M: f=6.651 mm, 2ω=79.2°, Y=5.5 mm Third Embodiment FIG. 7 is a cross-sectional view of the lens in the state in which a fisheye attachment FE according to a third embodiment is attached on the master lens M that is set to the wide-angle end. FIG. 8 shows aberrations in that state.

In Table 4 are presented various values on a third numerical embodiment of the fisheye attachment FE according to the third embodiment.

TABLE 4

| r1 = 2948.256 | d1 = 5.00 | n1 = 1.6055 | ν1 = 60.64 |
|---|---|---|---|
| r2 = 39.699 | d2 = 26.06 | | |
| r2* = 39.921 | | | |
| r2** = 35.253 | | | |

Aspherical Coefficient:

C2 = 1.5886 · 10⁻³    C4 = 3.7774 · 10⁻⁶    C6 = −1.0319 · 10⁻⁸
C8 = 9.1386 · 10⁻¹²   C10 = −3.5774 · 10⁻¹⁵   K = 0.0000

Figure 9:
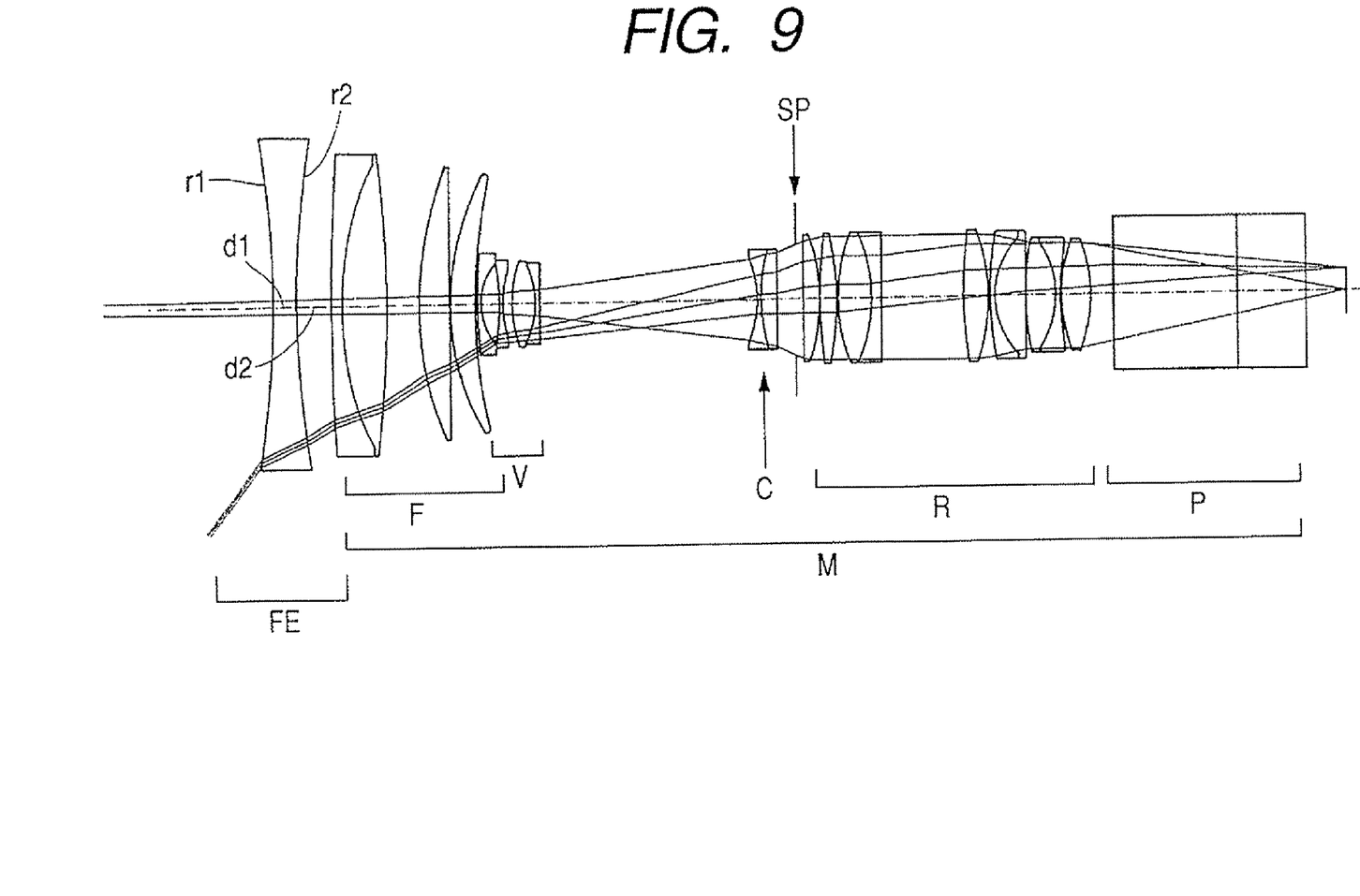
FIG. 9 is a cross-sectional view of a lens according to a fourth embodiment at the wide-angle end.
Figure 10:
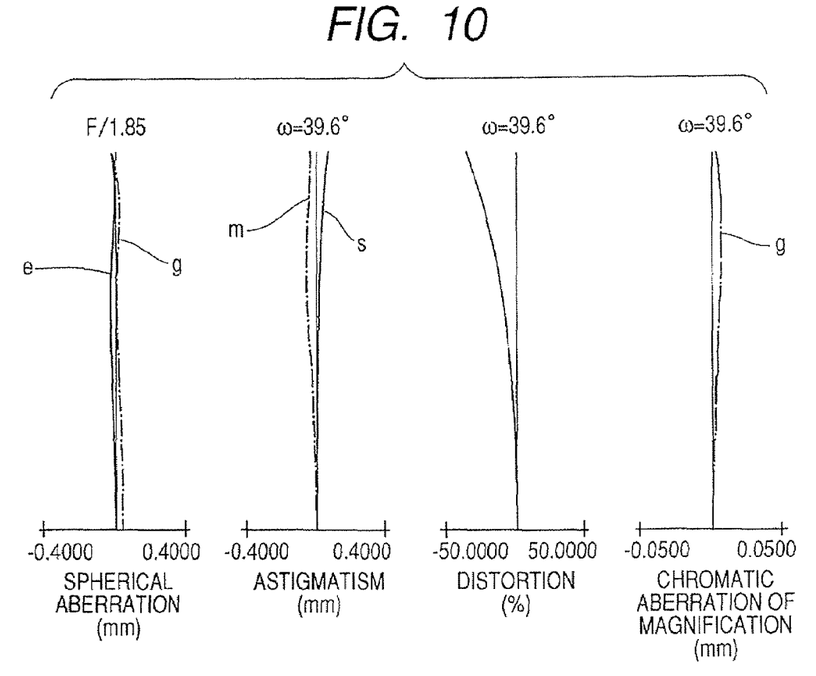
FIG. 10 shows aberrations in the fourth embodiment at the wide-angle end.

Values in the state in which the fisheye attachment FE according to the third embodiment is attached to the master lens M: f=4.275 mm, 2ω=104.3°, Y=5.5 mm Fourth Embodiment FIG. 9 is a cross-sectional view of the lens in the state in which a fisheye attachment FE according to a fourth embodiment is attached on the master lens M that is set to the wide-angle end. FIG. 10 shows aberrations in that state.

In Table 5 are presented various values on a fourth numerical embodiment of the fisheye attachment FE according to the fourth embodiment.

TABLE 5

| r1 = −141.812 | d1 = 5.00 | n1 = 1.4891 | ν1 = 70.23 |
|---|---|---|---|
| r2 = 96.250 | d2 = 7.46 | | |
| r2* = 170.220 | | | |
| r2** = 113.986 | | | |

Aspherical Coefficient:

C2 = −8.0830 · 10⁻⁴    C4 = −1.5102 · 10⁻⁶    C6 = −2.8377 · 10⁻¹¹
C8 = 2.2062 · 10⁻¹³    C10 = −1.1604 · 10⁻¹⁶   K = 0.0000

Figure 11:
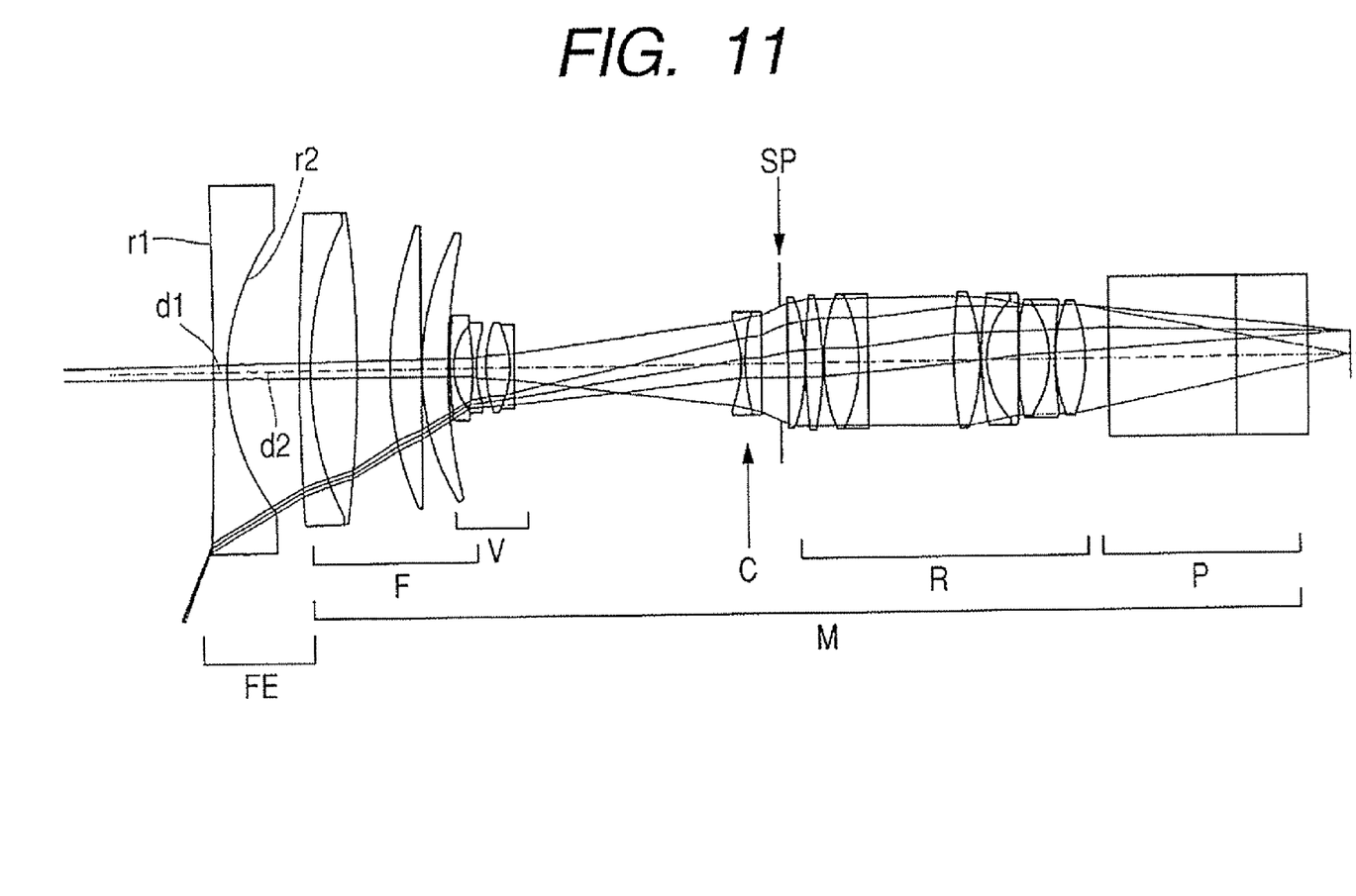
FIG. 11 is a cross-sectional view of a lens according to a fifth embodiment at the wide-angle end.
Figure 12:
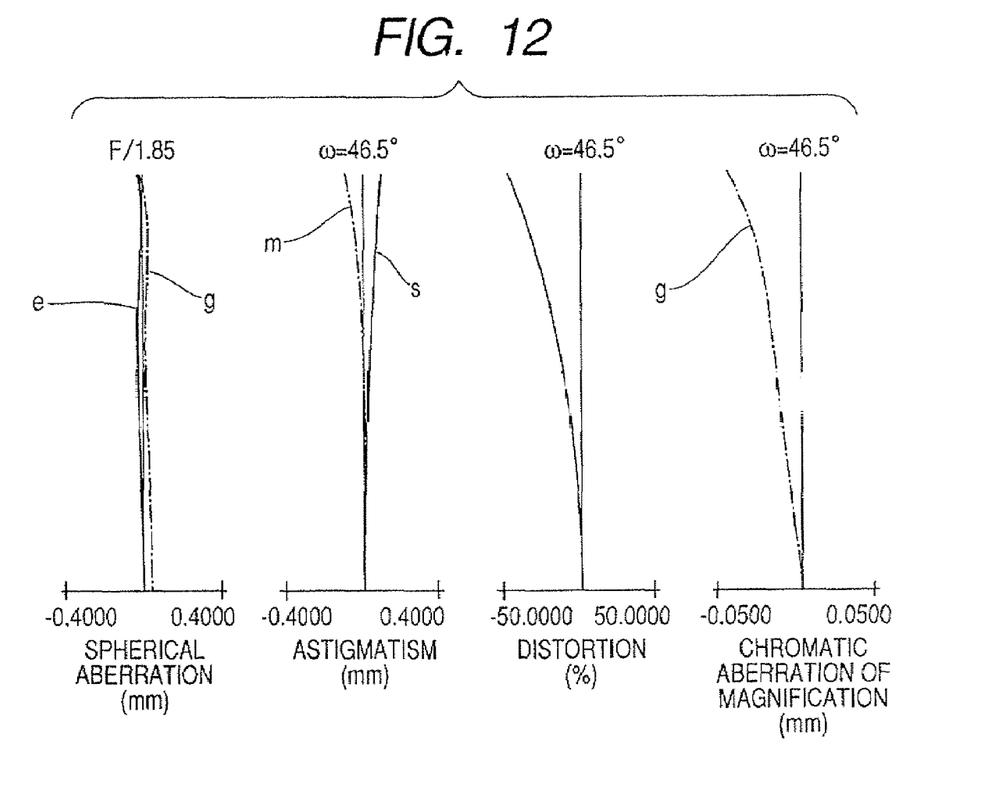
FIG. 12 shows aberrations in the fifth embodiment at the wide-angle end.

Values in the state in which the fisheye attachment FE according to the fourth embodiment is attached to the master lens M: f=6.650 mm, 2ω=79.2°, Y=5.5 mm Fifth Embodiment FIG. 11 is a cross-sectional view of the lens in the state in which a fisheye attachment FE according to a fifth embodiment is attached on the master lens M that is set to the wide-angle end. FIG. 12 shows aberrations in that state.

In Table 6 are presented various values on a fifth numerical embodiment of the fisheye attachment FE according to the fifth embodiment.

TABLE 6

| r1 = 675.725 | d1 = 5.00 | n1 = 1.8881 | ν1 = 40.76 |
|---|---|---|---|
| r2 = 64.469 | d2 = 15.46 | | |
| r2* = 62.291 | | | |
| r2** = 60.330 | | | |

Aspherical Coefficient:

C2 = 5.3205 · 10⁻⁴    C4 = 5.3502 · 10⁻⁸    C6 = −1.1670 · 10⁻¹⁰
C8 = −4.2160 · 10⁻¹⁴   C10 = −2.4278 · 10⁻¹⁷   K = 0.0000

Values in the state in which the fisheye attachment FE according to the fifth embodiment is attached to the master lens M: f=5.225 mm, 2ω=92.9°, Y=5.5 mm Table 7 shows the values associated with conditions (2), (3), (4) and (5) in numerical examples 1 to 5.

TABLE 7

| | Embodiment 1 | Embodiment 2 | Embodiment 3 | Embodiment 4 | Embodiment 5 |
|---|---|---|---|---|---|
| Fe | −77.418 | −124.996 | −58.965 | −128.365 | −74.874 |
| (2) \|Δ7/fe\| | 4.4815 · 10⁻³ | 1.2821 · 10⁻³ | 1.7452 · 10⁻² | 3.0056 · 10⁻³ | 1.5752 · 10⁻³ |
| (3) \|Δ4/Δ7\| | 0.4950 | 0.5889 | 0.3757 | 0.5533 | 0.3920 |

TABLE 7-continued

|  | Embodiment 1 | Embodiment 2 | Embodiment 3 | Embodiment 4 | Embodiment 5 |
|---|---|---|---|---|---|
| (4) \|Δ9/Δ7\| | 0.7046 | 0.5829 | 0.8561 | 0.6107 | 0.8272 |
| (5) SFa | −0.8913 | −0.0766 | −1.0275 | 0.0910 | −1.2031 |

According to the first to fifth embodiments, the fisheye lens attachment FE includes a lens having an aspherical surface r2 with a negative refractive power that satisfies conditions (2) through (5). With these conditions, a large negative distortion is generated. Thus, a fisheye attachment FE that is satisfactorily corrected in terms of astigmatism and field curvature while having a suitable fisheye effect can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-080461, filed Mar. 23, 2006, which is hereby incorporated by reference herein in its entirety.

What is claimed is:

1. An optical accessory arranged to change an optical characteristic of a shooting lens and to be detachably attached to an object side of a shooting lens, the optical accessory comprising:
    at least one lens FE having a negative refractive power, an image-side surface of the lens FE being an aspherical surface having a negative refractive power that decreases from the optical axis to its peripheral portion;
    wherein the following conditions are satisfied:

$8.0 \times 10^{-4} < |\Delta 7/fe| < 2.0 \times 10^{-2}$, $0.3 < |\Delta 4/\Delta 7| < 0.65$, and $0.4 < |\Delta 9/\Delta 7| < 1.0$, where fe represents the focal length of the lens FE, and Δ9, Δ7 and Δ4 respectively represent the aspherical amounts at the image heights of 90%, 70% and 40% of the effective diameter of the lens FE having the aspherical surface, the aspherical amount is defined by a distance between the aspherical surface of the aspherical lens FE and a spherical surface along the optical axis direction, where the spherical surface has a center of curvature radius on the optical axis and contains three points: a vertex of the aspherical lens FE; and both ends of the maximum effective diameter of the aspherical lens FE.

2. A shooting lens apparatus comprising:
    a shooting lens; and
    an optical accessory arranged to change an optical characteristic of a shooting lens and to be detachably attached to an object side of a shooting lens, wherein the optical accessory includes at least one lens FE having a negative refractive power, an image-side surface of the lens FE being an aspherical surface having a negative refractive power that decreases from the optical axis to its peripheral portion;
    wherein the following conditions are satisfied:

$8.0 \times 10^{-4} < |\Delta 7/fe| < 2.0 \times 10^{-2}$, $0.3 < |\Delta 4/\Delta 7| < 0.65$, and $0.4 < |\Delta 9/\Delta 7| < 1.0$, where fe represents the focal length of the lens FE, and Δ9, Δ7 and Δ4 respectively represent the aspherical amounts at the image heights of 90%, 70% and 40% of the effective diameter of the lens FE having the aspherical surface, the aspherical amount is defined by a distance between the aspherical surface of the aspherical lens FE and a spherical surface along the optical axis direction, where the spherical surface has a center of curvature radius on the optical axis and contains three points: a vertex of the aspherical lens FE; and both ends of the maximum effective diameter of the aspherical lens FE.

3. An image-pickup apparatus comprising:
    a shooting lens; and
    accessory arranged to change an optical characteristic of a shooting lens and to be detachably attached to an object side of a shooting lens, wherein the optical accessory includes at least one lens FE having a negative refractive power, an image-side surface of the lens FE being an aspherical surface having a negative refractive power that decreases from the optical axis to its peripheral portion;
    wherein the following conditions are satisfied:

$8.0 \times 10^{-4} < |\Delta 7/fe| < 2.0 \times 10^{-2}$, $0.3 < |\Delta 4/\Delta 7| < 0.65$, and $0.4 < |\Delta 9/\Delta 7| < 1.0$, where fe represents the focal length of the lens FE, and Δ9, Δ7 and Δ4 respectively represent the aspherical amounts at the image heights of 90%, 70% and 40% of the effective diameter of the lens FE having the aspherical surface, the aspherical amount is defined by a distance between the aspherical surface of the aspherical lens FE and a spherical surface along the optical axis direction, where the spherical surface has a center of curvature radius on the optical axis and contains three points: a vertex of the aspherical lens FE; and both ends of the maximum effective diameter of the aspherical lens FE.

* * * * *